3,110,101
METHOD FOR WELDING BODIES OF MOLYBDENUM, TUNGSTEN AND BODIES OF THEIR ALLOYS
Richard Kieffer and Karl Sedlatschek, Reutte, Tirol, Austria, assignors to Schwarzkopf Development Company, Dobbs Ferry, N.Y., a corporation of New York
Filed May 9, 1961, Ser. No. 111,125
4 Claims. (Cl. 29—487)

Welding of alloyed and unalloyed metallic bodies of molybdenum and tungsten has heretofore encountered practically unsurpassable difficulties, and welded bodies of such metals could not be used in applications in which they would be valuable because of their great high temperature strength such as in chemical apparatuses, rockets and the like.

As an example, although two bodies of molybdenum alloyed with 0.5% titanium which have been joined by an arc weld junction under a protective gas, such as hydrogen, helium or argon, have a weld junction which may superficially appear to be flawless, such weld junction is in fact very brittle due to recrystallization of the junction elements and in practice such weld junction does not have any cold ductility. (Throughout the specification all proportions are given by weight, unless specified otherwise.)

Among the objects of the invention is the provision of bodies of molybdenum, tungsten and their alloys joined by a welding junction having cold ductility that is higher by several orders of magnitude than prior welded junctions between such bodies.

In accordance with the invention, weld junctions between bodies of molybdenum, tungsten, and their alloys is given a higher order of cold ductility by subjecting the weld junction to a mechanical processing such as hammering at relatively high frequencies, for instance at the vibratory frequency of rivet hammers.

The foregoing and other objects of the invention will best be understood from the following description of exemplifications thereof, reference being had to the accompanying drawings wherein.

Figure 1:
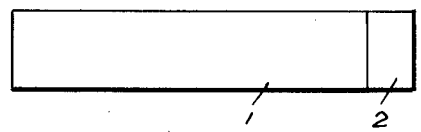
FIG. 1 is a side view of a metallic body, of molybdenum for instance, which is to be welded to another similar body.

Although the principles of the invention are applicable to forming welding junctions between metallic bodies of molybdenum, tungsten and their alloys, specific examples of the invention will be described below in connection with forming welding junctions of the invention between two bodies of molybdenum and molybdenum alloys, it being understood that the same principles of the invention are also applicable to forming welding junctions between bodies of tungsten and tungsten alloys to each other and welding junctions between bodies of molybdenum and molybdenum alloys to bodies of tungsten and tungsten alloys.

As stated above, in accordance with the invention, two refractory metal bodies of molybdenum or tungsten or their alloys are joined to each other by a weld junction, such as an arc-weld-junction, which has been subjected to a mechanical treatment, such as hammering, for giving the weld junction between two such refractory metal bodies the desired high cold ductility that is higher by several orders of magnitude than the heretofore known welded junction between such refractory welded bodies. The mechanical treatment of the invention to such weld-junction may be applied while it still remains hot due to the welding heat applied to form the welded junction between two such refractory metal bodies. Alternatively, the weld-junction between two refractory metal bodies may, after first being cooled, outside the welding enclosure, be subjected to mechanical treatment while heated to elevated temperature in the range between 400 and 1600 degrees C. under protective gas atmosphere.

As an example of the superiority of the weld-junction of refractory metallic bodies of the invention, an untreated weld junction of two molybdenum sheets alloyed with 0.5% titanium had a tensile strength of 20 to 40 kg./mm.$^2$ (kilogram per millimeter squared) and an elongation of 2%. In contrast, similar molybdenum alloy sheets joined to each other by a welding junction which was subjected to the mechanical treatment of the invention exhibited a tensile strength of 50 to 80 kg./mm.$^2$ and elongation of 4–12%.

In accordance with a further phase of the invention it is of advantage to place—at the junction regions of the two refractory metal bodies which are to be welded to each other—a foil or wire of rhenium or rhenium alloy as an addition to the metal to be welded to the two refractory metal bodies of the welded junction in order to give the originally brittle welded junction of such two refractory metal bodies a certain amount of ductility, thereby simplifying and facilitating the subsequent mechanical treatment which gives the welded junction the higher order of cold ductility. As an example, rhenium alloys which are suitable for forming weld-junctions of the invention between two molybdenum or molybdenum alloy bodies are alloys consisting, for instance, of 60% Mo, 30% Re and 10% Nb. As another example, suitable rhenium alloys for forming weld junctions of the invention between tungsten or two tungsten alloy bodies are alloys consisting of 70% W, 25% Re and 5% Ta. Good results are also obtained by providing the molybdenum and molybdenum-alloy bodies which are to be welded with a junction region formed of an alloy consisting of 60% Mo and 40% Re or of 70% Mo and 30% Re. Similar good results are obtained with welded junctions formed between two tungsten and tungsten-alloy bodies having junction regions formed of tungsten rhenium alloys consisting of 70% W and 30% Re, or 75% W and 25% Re.

As an example of the invention each molybdenum body which is to be joined to another molybdenum body has a junction region formed of a molybdenum rhenium alloy referred to above. FIG. 1 shows a shaped body of molybdenum 1 having as integral part thereof a junction region 2 formed of a molybdenum rhenium alloy such as described above. As an example, the composite integral body of FIG. 1 may consist of molybdenum rod 1 formed, for instance, by sintering a body of compacted molybdenum particles 1 with an integral adjoining rod region 2 formed of sintered molybdenum-rhenium alloy particles 2, the composite rod structure having been made by a conventional sintering process under a suitable protective atmosphere known in the art or by first compacting the two powder bodies 1 and 2 in a die under pressure into a self supporting compact and thereafter sintering the rod shaped compact of compact portions into a strong integral body of a relatively great length of sintered molybdenum particles 1 and an integral short length of sintered molybdenum rhenium alloy particles 2 of compositions such as described above. Thereafter, the compacted and sintered combination rod of FIG. 1 is subjected to a conventional rolling operation for reducing the thickness of the sintered rod and forming it into a rolled relatively thin sheet such as shown in FIG. 2 having a relatively long strong dense sheet section 3 consisting only of rolled and sintered molybdenum particles and an integrally joined strong dense junction sheet region 4 consisting of rolled sintered particles of a molybdenum rhenium alloy consisting, for instance, of 60% Mo, 30% Re and 10% Nb.

Figure 3:
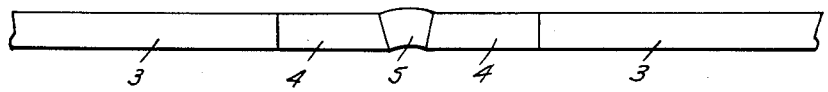
FIG. 3 is a view similar to FIG. 2 showing two bodies of FIG. 2 joined to each by a weld junction exemplifying the invention.

Two rolled and sintered composite sheets of molybdenum 3 with their respective junction sheet regions 4 are then held in juxtaposition with the facing edge surfaces of the molybdenum rhenum sheet regions 4 abutting each other, in a gas tight welding enclosure wherein the abutting edges of the rhenium alloy sheet regions 4 are joined by arc welding under a protective atmosphere in accordance with conventional arc welding procedures to form an arc welded junction region 5 which joins the two sheet bodies 3 with their junction sheet regions 4 into a composite integral sheet structure. The so-formed integral sheet having the shape shown in FIG. 3 has its weld junction region 5 subjected to a mechanical treatment, for instance, by hammering between a complementary hammer and anvil body or two complementary vibrating hammer bodies whereby the arc welded junction 5 of the two sheet bodies is given a modified metallic structure which exhibits a higher order of tensile strength and a higher order of elongation in cold state, for instance, increasing the tensile strength from 20–40 kg./mm.$^2$ to 50–80 kg./mm.$^2$ increasing the elongation from .2% to 4–12%.

Figure 2:
FIG. 2 is a view similar to FIG. 1 of the same body after rolling it to a sheet of reduced thickness.
Figure 4:
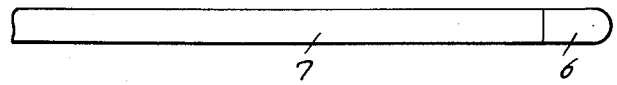
FIG. 4 is a view similar to FIG. 2 of another example of a molybdenum body provided with a junction region along which it is to be welded to a similar junction region of another similar body.

Instead of forming the two molybdenum sheets that are to be joined out of a compacted and sintered body consisting of a main body length of molybdenum particles a short body portion of molybdenum rhenium alloy particles as seen in FIG. 1 and thereafter rolling it into a denser and stronger relatively thin sheet such as shown in FIG. 2, the two such refractory sheets which are to be joined to each other along rhenium alloyed junction portions may be formed in another way. As an example, a sheet of refractory metal such as molybdenum or tungsten shown at 7 in FIG. 4 is joined to one edge thereof, a short sheet section or junction zone 6 joined thereto by arc welding, for instance under protective atmosphere. Junction zone 6 consists of a rhenium alloy of the refractory metal of the main sheet body. As an example, the main refractory sheet 7 of FIG. 4 may consist of substantially pure molybdenum to the junction edge of which was joined by arc welding a sheet section 6 consisting of an alloy containing, as an example, 60% Mo, 30% Re and 10% Nb. The welded junction between the main refractory metal sheet body 7 and its refractory alloy sheet zone 6 is subjected to a mechanical treatment such as, for instance, hammering to give the junction between the welded junction between sheet 7 and the sheet zone 6 a higher order of tensile strength and elongation or in general a higher order of cold ductility.

Figure 5:
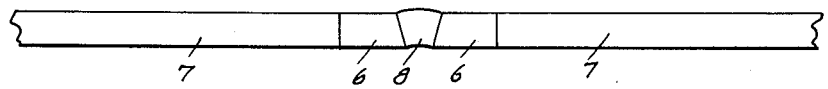
FIG. 5 is a view similar to FIG. 3 of two bodies of FIG. 4 joined to each other by a weld junction exemplifying the invention.

Thereafter, the two sheets such as shown in FIG. 4 are brought into a welding chamber wherein they are placed in juxtaposition as shown in FIG. 5 and the meeting edge surfaces of their junction zones 6 are welded to each other as by an arc under protective atmosphere to form a welding junction 8 which joins the two sheet bodies 7 into an integral sheet body of the to-be-desired refractory metal or metal element. The so-formed composite arc welded sheet structure of FIG. 1 has its arc welded junction region 8 subjected to mechanical treatment as by hammering whereby the welded junction zone 8 is given a greatly increased tensile strength and a higher order of tensile strength and a higher order of elongation and a higher order of cold ductility as explained above.

In each of the examples described above in connection with FIGS. 3 and 5 the arc welded junctions 5 and 8 respectively are formed of an alloy of the refractory metal of the main sheet with rhenium, because the meeting edge zones of the sheet sections 3—3 and 7—7 respectively are formed of such rhenium refractory metal elements.

Shaped refractory metal bodies of Mo, W, alloys of Mo or W with Re, Re+Nb or Re+Ta may be made by first producing an ingot of such body in an arc-welding furnace and thereafter giving the ingot the desired shape, for instance by forging, rolling or other mechanical processes known in the art. As an example, such processes are described in the article "Arc Melting Refractory Metals," by S. A. Herres and J. A. Davis, published in Steel Magazine of May 2, 1949, pages 82 to 86 and page 135, and the prior publications listed on page 135 of this article.

The features and principles underlying the invention described above in connection with specific exemplifications thereof, will suggest to those skilled in the art many other modifications thereof. It is accordingly desired that the appended claims shall not be limited to any specific features or details described in connection with the exemplifications thereof.

We claim:

1. A method for producing an integral metallic structure from a first and second structure section each consisting of a metal selected from the group consisting of molybdenum, tungsten and alloys of molybdenum and tungsten, with each section having a junction forming region, said method comprising the steps of joining said sections along their junction forming regions by welding with a metal selected from the group consisting of 70–30 and 60–40 molybdenum-rhenium, 75–25 and 70–30 tungsten-rhenium, 60–30–10 molybdenum-rhenium-niobium and 70–25–5 tungsten-rhenium-tantalum at elevated temperature and thereafter subjecting the welded junction to hammering at a substantial frequency which imparts to the welded junction a higher order of ductility.

2. The method of claim 1 wherein the welding is performed with a metal consisting of 70–30 and 60–40 molybdenum-rhenium.

3. The method of claim 1 wherein the welding is performed with a metal consisting of 75–25 and 70–30 tungsten-rhenium.

4. The method of claim 1 wherein the welding is performed with a metal consisting of 60–30–10 molybdenum-rhenium-niobium and 70–25–5 tungsten-rhenium-tantalum.

References Cited in the file of this patent

UNITED STATES PATENTS

| | | |
|---|---|---|
| 1,000,967 | Farquhar | Aug. 15, 1911 |
| 2,237,716 | Spaulding | Apr. 8, 1941 |
| 2,393,459 | Eitel et al. | Jan. 22, 1946 |

OTHER REFERENCES

Rare Metals Handbook, page 286, published in 1954 by Reinhold Publishing Company, New York, N.Y. (Copy in Div. 14.)